May 19, 1925.　　　　　　　　　　　　　　　　　　1,538,509
J. BERGIER
NEUTRALIZING OILS AND FATS
Filed Nov. 4, 1920
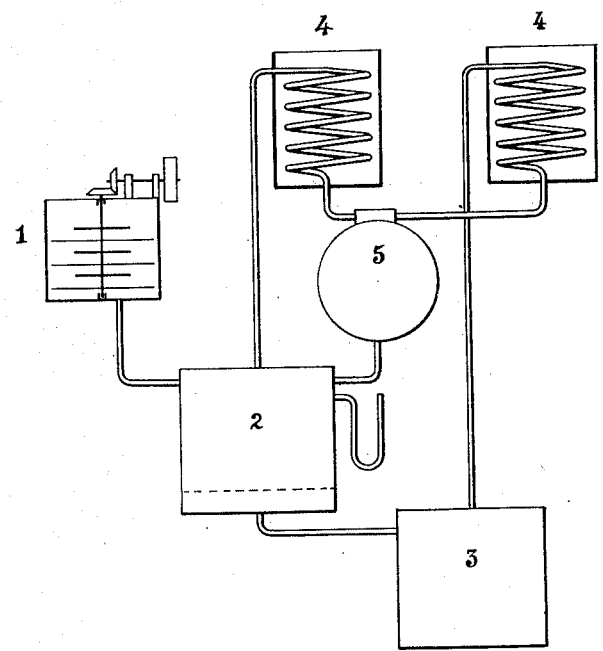

Patented May 19, 1925.

1,538,509

UNITED STATES PATENT OFFICE.

JEAN BERGIER, OF MARSEILLE, FRANCE, ASSIGNOR TO SOCIÉTÉ ROCCA, TASSY & DE ROUX, OF MARSEILLE (BOUCHE-DU-RHONE), FRANCE.

NEUTRALIZING OILS AND FATS.

Application filed November 4, 1920. Serial No. 421,703.

*To all whom it may concern:*

Be it known that I, JEAN BERGIER, a citizen of the Republic of France, residing at Marseille, Bouches-du-Rhone, France, have invented certain new and useful Improvements in Neutralizing Oils and Fats; and I do hereby declare the following to be a full, clear, and exact description of the invention, such as will enable others skilled in the art to which it appertains to make and use the same.

This invention relates to processes in which oils and fats are rendered neutral by saponifying the free fatty acids by means of alkali, or alkaline earths, the neutral fat or oil, being separated from the resulting soap paste.

In the processes hitherto in use, however, these pastes always retain a certain proportion of neutral fat, or oil, the amount of which increases with the quantity of free fatty acids present.

The present invention provides a process which enables the whole of the neutral fat, or oil, to be recovered, the said process being based on the principle that neutral fats, or oils, are soluble in volatile solvents, hydrocarbons, bisulfide of carbon, etc., whilst the pastes resulting from the neutralization are insoluble.

The usual working operation may be employed in carrying out the process of neutralization in accordance with this invention. The fat, or oil, to be neutralized is dissolved in the solvent and the solution is treated at ordinary temperature and atmospheric pressure, with any suitable alkali (such, for example, as soda lye, or lime) in an open, or closed vessel provided with an agitator.

The fat, or oil, is dissolved in the solvent in the proportions of 20 to 50 per cent according to its nature and degree of acidity.

When this operation is completed, solvent is added, and the mixture is transferred to a filtering vessel, where the separation of the paste is effected. The solvent and the neutral fat, or oil, are passed into a still, the paste being repeatedly washed with the solvent in order to extract the whole of the neutral fat. These washings may be either conveyed to the still, or else set aside for subsequent operations.

In the still, the solvent is expelled by distillation. The solvent, with which the soap is impregnated after the washings, is likewise distilled in the filtering vessel.

The accompanying drawing illustrates diagrammatically an example of apparatus which may be used in performing this invention. The vessel (provided with an agitator) in which the neutralization is effected is marked 1, 2 represents the filter for washing the soap, 3 indicates the still, 4 the condensers and 5 the solvent tank.

In the course of this treatment, there is a difficulty owing to the fact that the hydrated soap which is formed on neutralization with a solution of caustic soda, mechanically absorbs a considerable quantity of the solvent and forms a gelatinous mass, with the result that the separation of the solvent and the neutral oil, or fat, contained in the said mass can only be effected with difficulty, and preferably after partial drying by a current of air, or hot gas.

It is possible to overcome this difficulty by substituting, as saponifying agent for the aqueous solution of the alkali (such as carbonate of soda, or caustic soda for instance preferably in a pulverulent condition) anhydrous alkali, or alkaline earth, such for example as anhydrous carbonate of soda in the form of powder.

The resulting soap is then dry, its power of absorbing the solvent is lower, and the neutral oil, or fat, and solvent separate, without difficulty in the operations of filtration and distillation.

In the case of employing anhydrous carbonate of soda, approximately double the theoretical quantity can be used with advantage, the carbon dioxide liberated combining with the residual carbonate to form bicarbonate.

I claim:

1. In the separation of neutral fats from mixtures thereof with fatty acids by means of a solvent and a saponifying agent for the acids; the improvement which comprises dissolving the neutral fat in a solvent and saponifying the fatty acid by means of an anhydrous alkaline carbonate in excess, thereby forming separable granular bi-carbonate and soap.

2. In the separation of neutral fats from mixtures thereof with fatty acids by means of a solvent and a saponifying agent for the acids; the improvement which consists in acting upon the mixture and solvent with about double the quantity of anhydrous carbonate of sodium required for saponification, thereby forming dry bi-carbonate of sodium and soap, both readily separable from the solution of neutral fat.

In testimony that I claim the foregoing as my invention, I have signed my name.

JEAN BERGIER.